J. E. MOWINCKEL.
DEVICE FOR HANGING MEAT.
APPLICATION FILED APR. 27, 1905.
928,530.
Patented July 20, 1909.
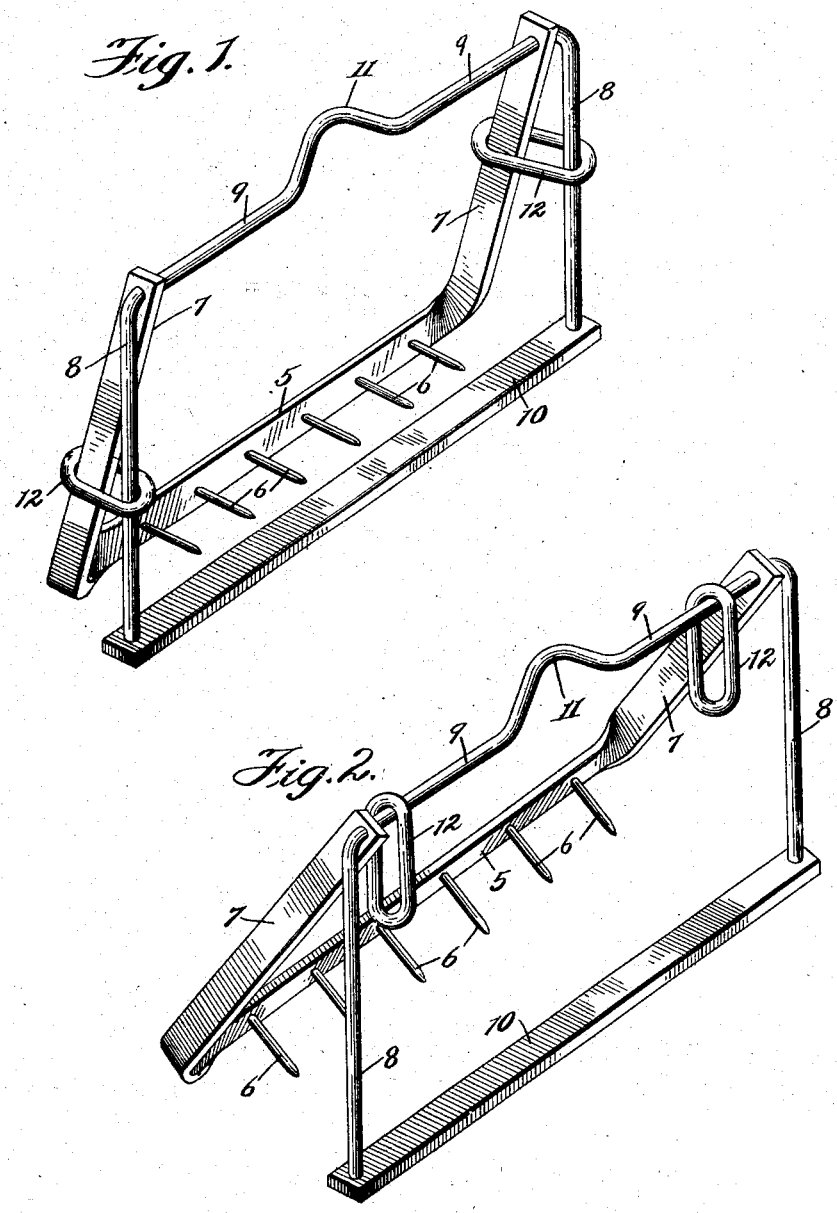

UNITED STATES PATENT OFFICE.

JACOB E. MOWINCKEL, OF KANSAS CITY, MISSOURI, ASSIGNOR TO SWIFT AND COMPANY, OF CHICAGO, ILLINOIS, A CORPORATION OF ILLINOIS.

DEVICE FOR HANGING MEAT.

No. 928,530.   Specification of Letters Patent.   Patented July 20, 1909.

Application filed April 27, 1905. Serial No. 257,767.

*To all whom it may concern:*

Be it known that I, JACOB E. MOWINCKEL, a citizen of the United States, residing at Kansas City, in the county of Jackson, State of Missouri, have invented certain new and useful Improvements in Devices for Hanging Meat, of which the following is a full and complete specification, reference being had to the accompanying drawings.

This invention relates to devices for hanging cuts or pieces of meat, and is particularly designed to be used in connection with the hanging of pieces of bacon during the process of smoking the same.

It is the object of my invention to provide a device which can be readily and quickly affixed to a piece of bacon, and when affixed will hold such bacon firmly and in such manner as to practically entirely prevent unequal stretching of the rind, and which will not damage the bacon or mar its appearance.

Broadly speaking, my invention consists of a bar of suitable length from one side of which projects a series of prongs that are adapted to be pressed into a piece of bacon near one end of such piece, such bar being provided with suitable means for suspension in a smoke-house or other place. As an effective means for preventing the piece of meat from becoming loosened from this pronged bar by reason of rough handling by workmen or from other cause, I have also provided a clamping device adapted to bear on the surface of the meat opposite to that into which the prongs are forced.

In the drawings:—Figure 1 is a perspective view of my meat holding bar with the clamping device in substantially the position that it would assume when a piece of meat was in place on the prongs, and Fig. 2 is a similar view with the clamping device swung outward.

Referring to these two figures of the drawings:—5 indicates a bar, preferably of metal, from one face of which projects a series of prongs 6. As shown, the end portions of this bar 5 are turned upward forming end pieces 7, the bar being preferably twisted as shown so as to present its flat faces toward each other. The number of the prongs 6 may be varied as desired, but there should be a sufficient number to insure the meat being held at quite a number of points from side to side, and the prongs are preferably spaced an equal distance apart.

8—8 indicate the side portions of a bail, the central or horizontal portion of which is indicated by 9. This bail passes through holes in the upper ends of the end pieces 7, so that the bail can be freely swung toward or away from the hanger frame 5—7.

10 indicates a cross bar, connecting the lower ends of the bail 8—9, and rigidly secured to such ends.

11 indicates a bend in the central portion of the part 9 of the bail, such bend being adapted to engage a hook or other support from which the device as a whole is to be suspended.

12—12 indicate links, each adapted to slip down over one of the end pieces 7 and one of the side portions 8 so as to draw the cross bar 10 up against the piece of meat that is impaled on the prongs 6, thus preventing, as before stated, any possibility of such piece of meat being accidentally dislodged or knocked off from the prongs from any cause. When not in use, or when it is desired to remove the piece of meat from the device, these links can be quickly pushed up onto the part 9 of the bail, where they will hang as shown in Fig. 2, and the bail then turned to carry the crossbar sufficiently away from the prongs to allow the removal of the piece of meat.

As before stated, this device is primarily intended for use in connection with pieces of bacon, and it is desirable that the rind be not punctured or cut; and the prongs will therefore generally be made of a length that will not pass entirely through a piece of bacon of ordinary size—it being understood, of course, that in securing a piece of bacon to the device, the bacon is presented with the flesh side toward the prongs.

By the use of my improved device I have been able to successfully suspend such pieces in a smoke-house so that during the process of smoking there would be no strain on the rind of the bacon that would cause it to stretch unequally and mar the appearance of the piece of bacon as a whole. But on the contrary, such pieces of bacon, when so suspended on my device, have come from the smoke-house in such symmetrical shape that the excessive trimming that was almost always necessary with the old ways of hanging, has been practically entirely eliminated and a considerable saving, as to material, time and labor, has been thereby effected. Furthermore, as has been already pointed out, unless the pieces of bacon are under average size, the prongs will not be long enough to be forced through and disfigure the rind.

What I claim as new, and desire to secure by Letters Patent, is:—

A meat hanging device, comprising a substantially horizontal bar having up-turned end portions, a series of rigid teeth projecting from said bar between said up-turned end portions, and a suspending device comprising a rod having down-turned end portions, the up-turned end portions of said horizontal bar being pivotally mounted upon the intermediate portions of said rod, and a cross-bar connecting the down-turned end portions of the suspending device and lying opposite the points of the teeth.

JACOB E. MOWINCKEL.

Witnesses:
ALBERT H. ADAMS,
MINNIE A. HUNTER.